US009876611B2

(12) United States Patent
Choi et al.

(10) Patent No.: US 9,876,611 B2
(45) Date of Patent: Jan. 23, 2018

(54) SYSTEM AND METHOD FOR RETRANSMITTING RECEIVED DATA USING INDEX CODING AND STATISTICAL CHARACTERISTICS

(71) Applicant: KOREA RAILROAD RESEARCH INSTITUTE, Uiwang-si, Gyeonggi-do (KR)

(72) Inventors: Sang Won Choi, Yongin-si (KR); Ju Yeop Kim, Seoul (KR); Yong Soo Song, Uiwang-si (KR); Yong Gyu Kim, Cheonan-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 43 days.

(21) Appl. No.: 15/072,982

(22) Filed: Mar. 17, 2016

(65) Prior Publication Data

US 2016/0365951 A1   Dec. 15, 2016

(30) Foreign Application Priority Data

Jun. 9, 2015   (KR) .................. 10-2015-0081519

(51) Int. Cl.
  *H04L 1/18*   (2006.01)
  *H04L 1/08*   (2006.01)
  *H04L 1/16*   (2006.01)

(52) U.S. Cl.
  CPC .............. *H04L 1/08* (2013.01); *H04L 1/1607* (2013.01)

(58) Field of Classification Search
  None
  See application file for complete search history.

(56) References Cited

U.S. PATENT DOCUMENTS

| 8,488,692 | B2* | 7/2013 | Imamura | H04L 1/0009 370/206 |
| 2003/0058873 | A1* | 3/2003 | Geiger | H04L 49/351 370/401 |
| 2008/0056255 | A1* | 3/2008 | Birman | H04L 12/1868 370/390 |
| 2009/0137252 | A1* | 5/2009 | Masseroni | H04L 47/10 455/446 |
| 2010/0011273 | A1* | 1/2010 | Parolari | H04L 1/1664 714/749 |
| 2013/0166983 | A1* | 6/2013 | Graumann | H04L 1/0025 714/749 |
| 2013/0286970 | A1* | 10/2013 | Wang | H04W 72/04 370/329 |
| 2016/0261382 | A1* | 9/2016 | Vajapeyam | H04L 1/1812 |

FOREIGN PATENT DOCUMENTS

KR   10-2002-0058411 A   7/2002

* cited by examiner

*Primary Examiner* — Daniel McMahon
(74) *Attorney, Agent, or Firm* — Novick, Kim & Lee, PLLC; Jae Youn Kim

(57) ABSTRACT

A method for transmitting packets by a transmitter in a wireless communication network and retransmitting the packets not received correctly by receivers is discussed. The method includes transmitting the packets to at least two receivers, receiving reception acknowledgement response signals including ACK or NACK signals for the packets transmitted to the receivers, analyzing patterns of the received reception acknowledgement response signals in accordance with a number of the ACK or NACK signals, differently index coding the packets which are not received correctly by each receiver, and retransmitting the index-coded packets.

26 Claims, 4 Drawing Sheets

| PATTERN | 0 | 1 | | 2 |
|---|---|---|---|---|
| MESSAGE GROUP | M0 | M1 | M2 | M3 |
| USER#0 | NACK | NACK | ACK | ACK |
| USER#1 | NACK | ACK | NACK | ACK |

FIG. 3

| PATTERN | 0 | 1 | | | 2 | | | 3 |
|---|---|---|---|---|---|---|---|---|
| MESSAGE GROUP | M0 | M1 | M2 | M3 | M4 | M5 | M6 | M7 |
| USER#0 | NACK | ACK | NACK | NACK | ACK | NACK | ACK | ACK |
| USER#1 | NACK | NACK | ACK | NACK | ACK | ACK | NACK | ACK |
| USER#2 | NACK | NACK | NACK | ACK | NACK | ACK | ACK | ACK |

FIG. 4

| PATTERN | 0 | 1 | | | | 2 | | | | | | 3 | | | | 4 |
|---|---|---|---|---|---|---|---|---|---|---|---|---|---|---|---|---|
| MESSAGE GROUP | M0 | M1 | M2 | M3 | M4 | M5 | M6 | M7 | M8 | M9 | M10 | M11 | M12 | M13 | M14 | M15 |
| USER#0 | NACK | ACK | NACK | NACK | NACK | ACK | ACK | ACK | NACK | NACK | NACK | NACK | ACK | ACK | ACK | ACK |
| USER#1 | NACK | NACK | ACK | NACK | NACK | ACK | NACK | NACK | ACK | ACK | NACK | ACK | NACK | ACK | ACK | ACK |
| USER#2 | NACK | NACK | NACK | ACK | NACK | NACK | ACK | NACK | ACK | NACK | ACK | ACK | ACK | NACK | ACK | ACK |
| USER#3 | NACK | NACK | NACK | NACK | ACK | NACK | NACK | ACK | NACK | ACK | ACK | ACK | ACK | ACK | NACK | ACK |

FIG. 5

| packet sepuence numbers of the packet index-coded by the transmitter | packet sepuence numbers of the packets successfully decoded by the receiver |
|---|---|
| 1024 | 1024 |
| 1025 | 1025 |
| 1026 | |

FIG. 6

SYSTEM AND METHOD FOR RETRANSMITTING RECEIVED DATA USING INDEX CODING AND STATISTICAL CHARACTERISTICS

TECHNICAL FIELD

Exemplary embodiments of the present invention relate to a system and a method for retransmitting received data, and more particularly, a system and a method for retransmitting received data using index coding in wireless communication environment and statistical characteristics of a reception acknowledgement response signal.

The present invention is research results performed as a part of a research development business of information and communications-broadcast technologies of Ministry of Science, ICT and Future Planning and Institute for Information & Communications Technology Promotion [Project Serial Number: B0101-15-1361, Research Project Name: Development of LTE Based Disaster Communication System Terminal for National Public Safety Service].

BACKGROUND ART

When unicasting, broadcasting, or multicasting is performed in a 4G LTE/LTE-A system and a 3G system of a mobile communication network, a receiver transmits a packet independent of appropriately receiving a transmitted signal mainly in an unacknowledged mode (UM). However, a broadcasting transmission scheme in the UM form has a limitation in communications for a special purpose such as a disaster network or communications having a mission critical character such as railway communication. Therefore, as an acknowledged mode (AM) form, there is a need to consider a form in which the receiver transmits whether to normally receive a packet to a transmitter in an ACK signal (acknowledgement response signal) or a NACK signal (non-acknowledgement response signal). However, in communication of such acknowledged mode (AM) form, there is a problem of increasing a retransmission frequency as the transmitter retransmits each of the packets which are not received by a receiver after the ACK signal or the NACK signal is received.

Recently, a technique of effectively transmitting packets to multiple receivers by using an index coding concept under the existing broadcasting/multicasting transmission environment has been proposed. Here, the index coding means that the transmitting side performs exclusive OR (XOR) operation processing on a plurality of packets. If the plurality of packets are index-coded to be transmitted as one packet, to select and receive packets which are not received by a receiving side, the packets which are not received correctly may be decoded by an exclusive OR operation of one packet which is subjected to the exclusive OR operation processing and the already received packet.

Further, unlike a STOP and WAIT method for transmitting one packet or receiving an ACK signal or a NACK signal, a go back-n method or a selective repeat ARQ method which is one of automatic repeat reQuest (ARQ) methods which are currently widely used at a retransmission technique of a mobile communication network is operated by a scheme of continuously transmitting packets within a specific window size, receiving an ACK signal or a NACK signal for all the transmitted packets and separately transmitting the packets which are not received correctly based on the received ACK signal or NACK signal, and sliding a window to perform a subsequent new transmission.

However, when the ARQ method is applied to the multicasting transmission environment, a terminal successfully receiving a specific packet redundantly receives packets previously received by retransmission, and as a result, radio resources may be inefficiently used, an unnecessary delay may occur, and a retransmission frequency may be increased.

DISCLOSURE

Technical Problem

An embodiment of the present invention is directed to a system and a method for retransmitting received data using index coding and statistical characteristics capable of analyzing statistical patterns of receivers which do not receive packets and packets as a result of receiving ACK signals or NACK signals transmitted from at least two receivers not receiving packets when the transmitter retransmits packets which are not received by the receiver and differently index coding the packet which are not received correctly using the analyzed patterns.

The technical projects of the present invention are not limited to those describing above, and the another technical projects which do not describe above will be apparent to those skilled in the art from the following description.

Technical Solution

In accordance with an embodiment of the present invention, a method for retransmitting received data using index coding and statistical characteristics in a method for transmitting packets, by a transmitter, to at least two receivers in a wireless communication network and retransmitting the packets which are not received correctly by each receiver, wherein the transmitter receives a reception acknowledgement response signal for the packets transmitted to the receiver and analyzes received patterns of the reception acknowledgement response signals transmitted from the receiver to differently perform index coding for each received pattern on the packets which are not received correctly by the receiver and retransmit the index-coded packets.

The packets may be collected as much as a window size W and thus at least two packets may be transmitted.

The received patterns may be each classified based on the number of received ACK signals or NACK signals corresponding to the reception acknowledgement response signals for each receiver.

The transmitter may differently classify the received patterns depending on whether only some of the receivers receive the packets by analyzing the received patterns of the reception acknowledgement response signals and when the received patterns correspond to the patterns received only by some receivers, the packets which are not received correctly by each receiver may be selected in the corresponding received pattern to be index-coded.

If the received patterns correspond to the patterns receiving packets only by some receiver, the transmitter may apply the following Equation 1 to calculate the maximum number of index-coded packets and combine the packets which are not received correctly for some of the maximum number of index-coded packets in consideration of the maximum number of index-coded packets for each received pattern received only by some receivers and complexity to perform the index coding.

$$_{K}C_{t}^{C}\left(\frac{t \cdot \kappa C_{t}}{K}+1\right),\qquad \text{[Equation 1]}$$

where $1 \leq t \leq K-1$.

(In the above Equation 1, K is the number of users, and t indicates pattern index defining the number of ACKs across all users for each message group. For example, in case of 4-users, we have the following ACK/NACK patterns. Specifically, the pattern index ranges from 0 to 4, where each pattern index indicates the number of ACK across 4-users. For each pattern, there are some message groups depending on specific ACK/NACK pattern across 4-users, which means that for a given pattern index, there can be several message groups.

For a given pattern index of t, the number of index coding pattern is $$\left( \frac{t \cdot {}_K C_t}{K} + 1 \right).$$

For example, when we define $m_k$ as packet in message group Mk in case of 3-users with a pattern index of 1, there can be following index-coded packet such as $m_1 \oplus m_2$, $m_2 \oplus m_3$, $m_1 \oplus m_3$, where in each index-coded packets, the number of messages in index-coded packet is 2. Here, $\oplus$ indicates XOR operation.

TABLE 1

ACK/NACK pattern in case of 3-users

| Pattern | | | | | | | |
|---|---|---|---|---|---|---|---|
| 0 | 1 | | | 2 | | | 3 |
| Message group | | | | | | | |
| M0 | M1 | M2 | M3 | M4 | M5 | M6 | M7 |
| User#0 NACK | ACK | NACK | NACK | ACK | NACK | ACK | ACK |
| User#1 NACK | NACK | ACK | NACK | ACK | ACK | NACK | ACK |
| User#2 NACK | NACK | NACK | ACK | NACK | ACK | ACK | ACK |

$${}_K C_t^C \left( \frac{t \cdot {}_K C_t}{K} + 1 \right)$$

represents the number of maximally possible index-coded packets for a given pattern index of t.

The transmitter may transmit an index coding check bit upon the transmission of the packets to allow the receiver to differentiate the index-coded packets from the packets which are not index-coded.

The transmitter may transmit packet sequence numbers allocated to each packet along with the corresponding packets upon the transmission of the packets to the receiver.

The transmitter may transmit a packet sequence number of a first transmitted packet or a packet sequence number having the smallest number and an increment of the rest packet sequence number when at least two of the packet sequence numbers are transmitted and the increment of the rest packet sequence numbers may be values corresponding to a difference between the first transmitted packet sequence number or the packet sequence number having the smallest number and each of the other packet sequence numbers.

The transmitter may store and manage a difference value between the packet sequence number of the first transmitted packet or the packet sequence number having the smallest number and the rest packet sequence numbers.

The transmitter may not perform the retransmission when the received patterns are patterns in which all the receivers receive the packets and transmit packets set as much as a subsequent window size W.

The transmitter may not perform the index coding on the packets which are not received correctly by each receiver when the received patterns are the patterns in which all the receivers do not receive the packets and retransmit each of the packets.

When decoding the packets retransmitted from the transmitter, the receiver may determine whether the retransmitted packet is an index coded packet based on the index coding check bit.

When the packet retransmitted from the transmitter corresponds to the index-coded packet, the receiver may perform the exclusive OR operation on the already successfully received packets to decode the packets which are not received correctly.

When decoding the index-coded packets retransmitted from the transmitter, the receiver may find out packet sequence numbers of the packets which are not received correctly by matching the packet sequence number transmitted along with the index coded packet and the packet sequence numbers of the already successfully received packets to decode the corresponding packets.

The receiver stores packet sequence numbers of each packet transmitted from the transmitter and stores a packet sequence number of a first transmitted packet or a packet sequence number having the smallest number and an increment of the rest packet sequence numbers and the increment of the rest packet sequence numbers is values corresponding to a difference between the first transmitted packet sequence number or the packet sequence number having the smallest number and each of other packet sequence numbers.

In accordance with another embodiment of the present invention, a system for retransmitting received data using index coding and statistical characteristics in a method for transmitting packets, by a transmitter, to at least two receivers in a wireless communication network and retransmitting, by the transmitter, packets which are not received correctly by each receiver includes: a transmitter configured to transmit packets to the receivers, receive reception acknowledgement response signals from each receiver, differently perform the index coding on the packets which are not received correctly depending on the received patterns of the reception acknowledgement response signals and retransmit the packets which are not received correctly; and a receiver configured to transmit the reception acknowledgement response signal to the transmitter depending on whether to receive the packets transmitted from the transmitter, receive the index-coded packets from the transmitter and decode the index-coded packets to again receive the packets which are not received correctly.

Advantageous Effects

According to the system for retransmitting received data using index coding and statistical characteristic of the present invention, it s possible to effectively reduce the retransmission frequency of the packets which are not received correctly transmitted to each receiver and the channel use frequency on communications and effectively use the limited radio resources, by analyzing the statistical patterns of the receivers not receiving the packets or the packets as a result of receiving the ACK signals or the NACK signals transmitted from at least two receivers not receiving the packets among the receivers when the transmitter retransmits the packets which are not received correctly by the receiver and differently index-coding the packet which are not received correctly using the analyzed patterns.

DESCRIPTION OF DRAWINGS

FIG. 3 is a diagram illustrating an example of a received pattern when K (the number of receivers) is equal to 2 in the exemplary embodiment of FIG. 1.

FIG. 4 is a diagram illustrating an example of a received pattern when K (the number of receivers) is equal to 3 in the exemplary embodiment of FIG. 1.

FIG. 5 is a diagram illustrating an example of a received pattern when K (the number of receivers) is equal to 4 in the exemplary embodiment of FIG. 1.

FIG. 6 is a diagram illustrating a method for managing a packet sequence in the exemplary embodiment of FIG. 1.

BEST MODE

Hereinafter, exemplary embodiments of the present invention will be described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Hereinafter, a system and a method for transmitting a packet using index coding and statistical characteristic according to an exemplary embodiment of the present invention will be described.

According to the exemplary embodiment of the present invention, upon a transmission of packets from a transmitter to a receiver, some packets are collected as much as a window size W and then a plurality of packets are transmitted in batch, and therefore a delay tolerant service needs to be assumed. That is, to transmit the plurality of packet in batch, it is assumed that a storage module having a buffer size larger than a predetermined size or a data storage means equivalent thereto are included. However, when the size of the storage module is not infinite but has a window size W having a predetermined size, if the window size W is small, a real-time transmission service may be satisfied to some extent.

Further, a transmission error probability of the packet under the wireless communication environment may be changed depending on channel coding and a modulation order of a physical layer, channel characteristics between a transmitter and a receiver, etc., and therefore each receiver transmits ACK or NACK signals to a transmitter, and therefore for the same packets, the transmitter may appreciate whether each receiver successfully receives the packets. Further, to acknowledge a non-received or received specific packet depending on whether the packets are received, a packet transmission sequence needs to be aligned. Therefore, there is a need to control and manage packet sequence numbers allocated to packets upon the transmission of the packets from the transmitter and the receiver.

Figure 1:
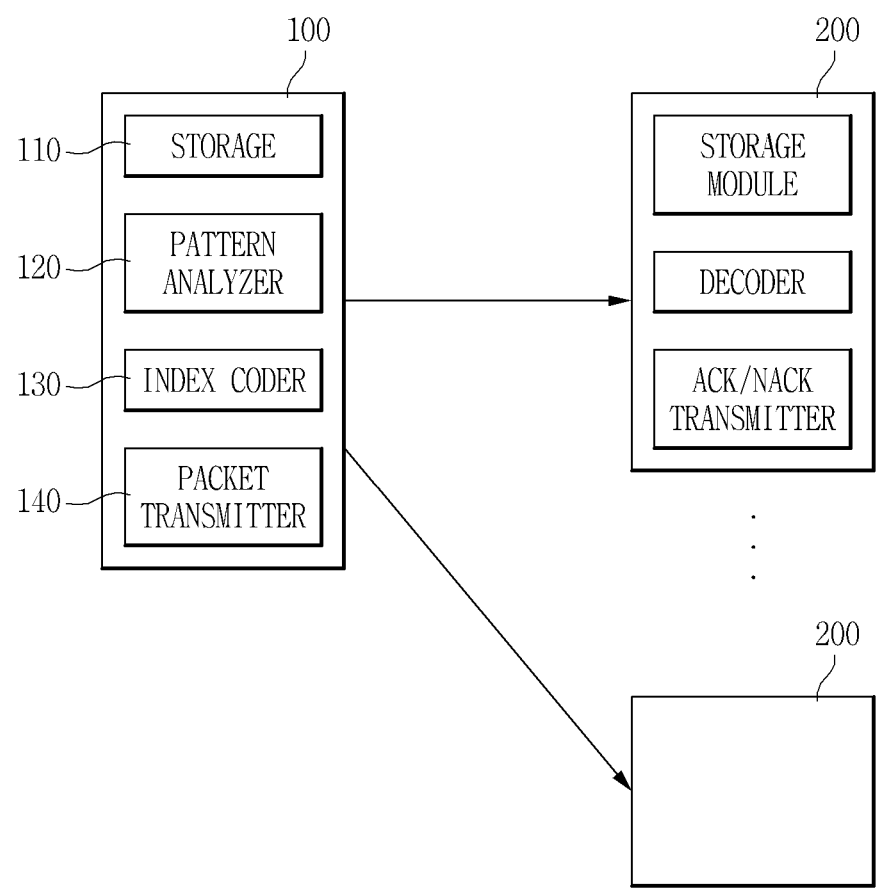
FIG. 1 is a block diagram illustrating a configuration of a transmitter and a receiver included in a system for retransmitting received data using index coding and statistical characteristics according to an exemplary embodiment of the present invention.

FIG. 1 is a block diagram illustrating a configuration of a transmitter and a receiver included in a system for retransmitting received data using index coding and statistical characteristics according to an exemplary embodiment of the present invention.

As illustrated in FIG. 1, the system for retransmitting data for packet retransmission under the wireless communication environment according to the exemplary embodiment of the present invention includes a transmitter 100 and at least two receivers 200.

The transmitter 100 is a terminal transmitting a data packet to the receiver 200. The transmitter 100 may correspond to, for example, a base station communicating with a plurality of terminals located in a cell range and further includes a storage 110, a pattern analyzer 120, an index coder 130, and a packet transmitter 140.

The storage 110 serves to store packets to be transmitted from the transmitter 100 to the receiver 200. In this case, according to the exemplary embodiment of the present invention, some packets are collected as much as the window size W and then a plurality of packets are transmitted, such that the plurality of packets may be stored in the storage 110.

In particular, when the index coding is performed on packets which are not received by the receiver 200 for retransmission, the storage unit 110 may store the packets which are not received correctly which are index-coded or may also store the packets classified depending on ACK signal/NACK signal patterns for each pattern.

The ACK signals or the NACK signals corresponding to reception acknowledgement response signals transmitted from each receiver 200 are stored in the storage 110 according to the patterns, looking at the corresponding packet sequence number. That is, when the number of receivers 200 is K, a total of K+1 patterns are generated, packets belonging to pattern k (k=0, 1, . . . , K) are index-coded for each pattern and then are stored in the storage 110 along with the packet sequence numbers. In the case of storing the packet sequence numbers, for all packets, the packet sequence numbers are not stored and the smallest packet sequence number among the stored packet sequence numbers is stored and for the rest packet sequence numbers, only an increment is stored, such that the number of bits may be reduced, thereby efficiently performing an operation and management.

Here, when for W packets, packets are transmitted in batch, the number of bits required for the increment of the packet sequence numbers becomes ceil (log 2 (W)) bits. Here, the ceil (x) means the smallest number among positive integers which are equal to or lager than x.

Meanwhile, a maximum transmission frequency may be defined between the transmitter 100 and the receiver 200 by signaling and when they reach the maximum transmission frequency, both of the W packets and the corresponding packet sequence numbers are reset and thus packets and packet sequence numbers for subsequent transmission are stored.

The pattern analyzer 120 analyzes the patterns as a result of receiving the ACK signals or the NACK signals which are the reception acknowledgement response signals transmitted from the receiver 200 and provides the analyzed pattern information to select the index-coded packets for each pattern analyzed by the index coder.

Here, a method for acknowledging packets which are not received correctly may acknowledge the packets which are not received correctly by receiving the both ACK signals and the NACK signals but may also acknowledge the packets which are not received correctly by receiving either the ACK signals or the NACK signals. For example, when only the ACK signal is received, a time is set in advance and thus when the ACK signal is not received for the set time, the transmitter 100 determines the corresponding packet not transmitting the ACK signal from the receiver 200 as the packet which are not received correctly. On the contrary, in the case of receiving only the NACK signal, when the transmitter 100 does not receive the NACK signal for the set time, the method for acknowledging packets which are not received correctly may be operated as a method for determining that there is no packet which are not received correctly.

The received pattern of the reception acknowledgment response signal is classified into three such as the case in which the receiver 200 successfully receives all the transmitted packets, the case in which only some of the transmitted packets are received, and the case in which all the transmitted packets are not received and a detailed description of a method for performing index coding on packets according to the classified received pattern will be described below.

When the packets which are not received correctly which are index-coded for each received pattern classified by the analysis of the pattern analyzer 120 as a result of receiving the ACK signal or the NACK signal are selected, the index coder 130 performs the index coding on the selected packets. Here, the index coding means the exclusive OR operation on the plurality of packets. The plurality of packets are index-coded to form one packet which is index-coded.

Further, the index coder may generate an index coding check bit and allocate the generated index coding check bit to packet to differentiate the index-coded packets from packets which is not index-coded by the receiver 200 upon the transmission of the index-coded packets to the receiver 200. The transmitter 100 may set the index coding check bit to be, for example, '1' in advance in the case of the index-coded packet and may set the index coding check bit to be '0' in advance in the case of the packet which is not index-coded.

The packet transmitter 140 may basically transmit packets as much as the window size W and may retransmit the index-coded packet or the packets which are not index-coded to the receiver 200 according to the pattern analysis of the ACK signal or the NACK signal received from the receiver 200 by the pattern analyzer 120 after the transmission of the packets. In this case, the packets may be transmitted together by allocating the corresponding packet sequence number to the packet sequence upon the transmission of the packets.

Meanwhile, the receiver 200 is a terminal receiving data packets within a coverage area from the transmitter 100 and may be, for example, a vehicle on board controller in a train which is connected to a base station in wireless communication under the environment of a wireless train control system.

In detail, the receiver 200 may further include a storage module 220, a decoder 230, and an ACK/NACK transmitter 240.

The decoder 230 performs decoding on packets from the transmitter 100 for reception processing.

Here, the packet decoding process is changed according to the case in which the transmitter 100 performs the index coding or does not perform the index coding. The case in which the index coding is performed and the case in which the index coding is not performed may be acknowledged by the index coding check bit transmitted together upon the transmission of the packets from the transmitter 100.

In detail, when it is determined that the packet is not index-coded, the decoding of the packet is performed by referring to one packet sequence number. Further, when the decoding is normally performed, and thus it is determined that the packet is received successfully, it is determined as the ACK signal, and otherwise, it is determined as the NACK signal.

On the other hand, when it is determined that the packet is index-coded, they match the corresponding packet sequence numbers of the successfully received pre-stored packets by referring to the packet sequence numbers before the index-coded packets are coded, such that the process of decoding only the packet which are not received correctly from the index-coded packet is required.

That is, the packet sequence numbers of the packets which are not received correctly are found by the exclusive OR (XOR) operation of the packet sequence number of the packets before the index coding included in the index-coded packets with the already successfully received packet sequence numbers, such that the process of decoding packets which are not received correctly is required.

The storage module 220 stores the already successfully received packets. When the already successfully received packets are index-coded by the decoder 230 to decode the transmitted packets, the successfully received packets stored in the storage module 220 may be provided. Further, the storage module 220 stores and manages the corresponding packet sequence number of the successfully received packets. In this case, as a method for storing packet sequence numbers, for all the packets, the packet sequence numbers are not stored and the smallest packet sequence number among the stored packet sequence numbers is stored and for the rest packet sequence numbers, only an increment is stored.

Further, the storage module may define the maximum transmission frequency which may be maximally transmitted between the transmitter 100 and the receiver 200 by signaling, reset the corresponding packet sequence number and the packet pres-stored in a packet unit of the window size W according to the transmission result for the defined maximum transmission frequency, and secure a space in which packet information required for subsequent transmission is stored.

The ACK/NACK transmitter 240 transmits the ACK signal or the NACK signal to the transmitter 100 according to whether the packets are successfully received by the decoding on the packets received as much as the window size W. In this case, the packet sequence number needs to be transmitted to packets corresponding to the ACK signal or the NACK signal. Further, when the ACK signal or the NACK signal is transmitted to the transmitter 100, the ACK signal or the NACK signal is numbered to be transmitted so as to differentiate each receiver 200, which is to separately transmit and manage the ACK signal or the NACK signal in a unicast type by using the numbered signal when the wired or wireless channel environment in the receiver 200 is poor.

The packet sequence number is allocated and transmitted together when the packet is transmitted from the transmitter 100 to the receiver 200, but the packet sequence number also needs to be transmitted together even when the ACK signal or the NACK signal for the packet which is not received by the receiver 200 is transmitted to the transmitter 100. In this case, a method for transmitting an initial sequence number or a packet sequence number having the smallest value when the sequence numbers of each packet are transmitted and transmitting a difference value from a first transmitted packet sequence number, that is, only a bit of the increment when the sequence numbers of the rest packets are transmitted is used, thereby reducing a load depending on a bit transmission amount and efficiently managing the bit.

Figure 2:
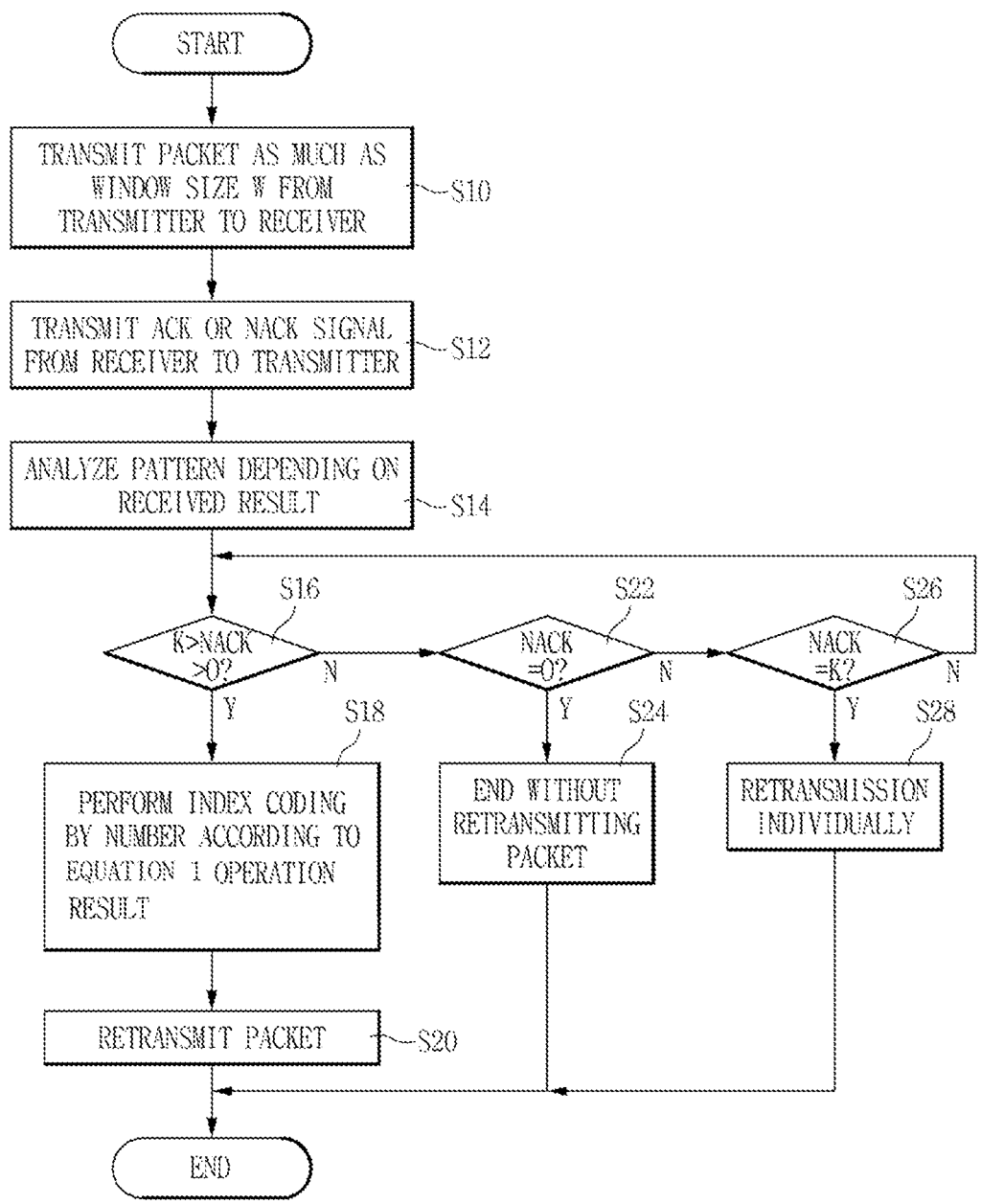
FIG. 2 is a flow chart illustrating a method for retransmitting data using index coding and statistical characteristics according to an exemplary embodiment of the present invention.

FIG. 2 is a flow chart illustrating a method for retransmitting received data using index coding and statistical characteristics according to an exemplary embodiment of the present invention, FIG. 3 is a diagram illustrating an example of a received pattern when K (the number of receivers) is equal to 2 in the exemplary embodiment of FIG. 1, FIG. 4 is a diagram illustrating an example of a pattern when K (the number of receivers) is equal to 3 in the exemplary embodiment of FIG. 1, and FIG. 5 is a diagram illustrating a pattern example when K (the number of receivers) is equal to 4 in the exemplary embodiment of FIG. 1 and FIG. 6 is a diagram illustrating an example of a method for managing a packet sequence in the exemplary embodiment of FIG. 1.

A method for transmitting data packets from the transmitter 100 on the wireless communication network to the plurality of receivers 200 as much as the window size W and retransmitting non-received data packets among the plurality of transmitted packets will be described below with reference to FIGS. 2 to 6.

First, the transmitter 100 transmits the plurality of packets to the receiver 200 a much as the preset window size W and then receives the ACK signals or the NACK signals from each receiver 200, such that transmitter 100 may acknowledge the packets which are not received correctly (S10, S12).

When retransmitting the packets which are not received correctly to the corresponding receiver 200, the transmitter 100 performs the index coding on at least two packets which are not received correctly and transmits them.

In this case, as a standard of index coding the packets which are not received correctly, the patterns of the packet which are not received correctly are analyzed as a result of receiving the ACK signal or the NACK signal (S14). The index coding of the packets which are not received correctly may be differently performed depending on the analyzed patterns.

In this case, the analyzed patterns are each classified based on the number of received ACK signals or NACK signals and each pattern may be classified considering all the number of cases in which the ACK signal or the NACK signal is received/non-received as the result of receiving ACK signals or NACK signals for each packet and then the packets may be stored for each corresponding pattern.

FIG. 3 illustrates an example of the patterns as the result of receiving the ACK signals or the NACK signals when K (the number of receivers) is equal to 2.

Describing it with reference to, for example, FIG. 3, when K (the number of receivers) is equal to 2, all three patterns from pattern index of 0 to pattern index of 2 are generated as the result of receiving the ACK signal or the NACK signal.

The pattern index of 0 is the case in which only the NACK signal is received and corresponds to the case in which all the receivers 200 do not receive packets transmitted from the transmitter 100. The pattern index of 1 corresponds to the case in which the ACK signal or the NACK signal is each received. Here, as the pattern index of 1, there are the two cases in detail. One case is that a first receiver USER#0 does not receive the packet and the other case is that a second receiver USER#1 does not receive the packet. Further, the pattern index of 2 is the case in which only the ACK signal is received and corresponds to the case in which all the receivers 200 successfully receive the packets.

It is determined whether to retransmit the packets depending on the classified patterns. The pattern index of 0 performs the retransmission without the separate index coding since all the receivers 200 do not receive the packets and the pattern index of 2 does not have to perform the retransmission since all the receivers 200 receive the packets.

Unlike the pattern index of 0 and the pattern index of 2, the pattern index of 1 corresponds to the case in which any one of the first receiver USER#0 and the second receiver USER#1 does not receive the packet, and therefore compared to separately transmitting each of the packets which are not received correctly, performing the index coding on the packets which are not received correctly to be transmitted as one packet is appropriate in the transmission efficiency. In this case, a combination of the index coding of the packets may be calculated based on the following Equation 1.

$$_K C_t^C \left( \frac{t \cdot {_K C_t}}{K} + 1 \right),$$ [Equation 1]

where $1 \leq t \leq K-1$.

In the above Equation 1, $$_K C_t^C \left( \frac{t \cdot {_K C_t}}{K} + 1 \right)$$

represents the number of maximally possible index-coded packets for a given pattern index of t.

When the above Equation 1 is applied to the case of the pattern index of 1 in case of K=2, the total number of index coded pattern is 1 from Equation 1, which corresponds to $m_1 \oplus m_2$.

Therefore, a single packet of m1⊕m2 type is generated by performing the index coding on the packets which are not received correctly m1 and m2.

Depending on ACK/NACK patterns across all users, it is determined whether to retransmit the packets or whether to perform index coding. Note that Equation 1 can be applied to all possible cases of index coding for any K and t. Thus, it is possible to implement apparatus with generalized index coding from Equation 1.

Describing an example of another received pattern of the case in which K (the number of receivers)=3 with reference to FIG. 4, the received pattern may be classified into four patterns from pattern index of 0 to pattern index of 3 depending on the number of received ACK signals or NACK signals.

The pattern index of 0 is the case in which all the receivers 200 does not receive the packets and corresponds to the case in which the retransmission to each receiver 200 without the index coding is performed and the pattern index of 3 is the case in which all the receivers 200 receive the packets and needs not to retransmit the packet.

However, the pattern index of 1 and the pattern index of 2 correspond to the case in which there are at least one packet which are not received correctly for all receivers among the receivers 200. In particular, the pattern index of 1 corresponds to the case in which one receiver receives the packets and the pattern index of 2 corresponds to the case in which two receivers receive the packets. In this case, upon the application of the above Equation 1, the number of index coding is changed and thus the method for performing the index coding is also changed.

Upon the application of the above Equation 1 in the pattern index of 1, the number of packets combined by the index coding in the case of K=3, total number of index coding pattern is 3 from Equation 1. Specifically, in this case, the number of packets index-coded by combining the packets which are not received by each receiver 200 are three as $m_1 \oplus m_2$, $m_2 \oplus m_3$, and $m_1 \oplus m_3$.

Upon the application of the above Equation 1 in the pattern index of 2, the number of packets combined by the index coding in the case of K=3, total number of index coding pattern is 1 from Equation 1. Specifically, in this case, the packet index-coded by combining the packets which are not received correctly is a single packet formed of $m_4 \oplus m_5 \oplus m_6$ and is coded.

Describing an example of another received pattern of the case in which K (the number of receivers)=4 with reference to FIG. 5, the pattern may be classified into five patterns from pattern index of 0 to pattern index of 4 depending on the number of received ACK signals or NACK signals.

The pattern index of 0 is the case in which all the receivers 200 does not receive the packets and corresponds to the case in which the retransmission to each receiver 200 without the index coding is performed and the pattern index of 4 is the case in which all the receivers 200 receive the packets and needs not to retransmit the packet.

However, the pattern index of 1, the pattern index of 2, and the pattern index of 3 correspond to the case where there at at least one packet which are not received correctly for all receivers. Here, the pattern index of 1 corresponds to the case in which the number of receivers receiving the packets among the receivers 200 is one, the pattern index of 2 corresponds to the case in which the number of receivers receiving the packets is two, and the pattern index of 3 corresponds to the case in which the number of receivers receiving the packets is three. Therefore, upon the application of the above Equation 1 to each pattern, the number of index coding is changed and thus the method for performing the index coding is also changed as follows.

Upon the application of the above Equation 1 in the pattern index of 1, the number of index coding pattern in the case of K=4 is 6.

Therefore, the packets index-coded by combining the packets which are not received correctly for all receivers are generated by, for example, six combinations of the coded packets $m_1 \oplus m_2$, $m_1 \oplus m_3$, $m_1 \oplus m_4$, $m_2 \oplus m_3$, $m_2 \oplus m_4$, and $m_3 \oplus m_4$ among packets $m_1$, $m_2$, $m_3$, and $m_4$, which are not received correctly for all receivers. Here, it is assumed that the packets in message group of M1, M2, M3, and M4 are transmitted to each receiver 200 and the possible combinations of the index coding packets are calculated.

Upon the application of the above Equation 1 in the pattern index of 2, the number of index coding pattern in case of K=4 is 15 from Equation 1.

Therefore, the packets index-coded by combining the packets which are not received correctly may be coded by, for example, twenty combinations of packets among $m_5$, $m_6$, $m_7$, $m_8$, $m_9$, and $m_{10}$, which are packets which are not received correctly by each receiver 200. Here, it is assumed that the packets in message group of M5, M6, M7, M8, M9, and M10 are transmitted to each packet which is not received correctly for all receivers and the possible combinations of the index coding packets are calculated.

Upon the application of the above Equation 1 in the pattern index of 3, the number of packets combined by the index coding in the case of K=4 is 1 from Equation 1.

Therefore, the packets index-coded by combining the packet which are not received correctly are coded by, for example, a single packet formed of $m_{11} \oplus m_{12} \oplus m_{13} \oplus m_{14}$ among packets in the message group of M11, M12, M13, and M14 which correspond to packets which not received correctly for at least one receiver 200. Here, it is assumed that the packets corresponding to M11, M12, M13, and M14 are transmitted to each receiver 200 and the possible combinations of the coding packets are calculated.

Meanwhile, collectively describing the examples of the received pattern illustrated in FIGS. 3 to 5, it may be appreciated that the statistical characteristics that the number of classified patterns is increased one by one whenever the number K of receivers 200 is increased one by one appears.

When the pattern analysis is completed in step S14, it is first determined that the corresponding pattern is a pattern in which there is at least one packet which are not received correctly for all receivers among the patterns classified as the analysis result (S16).

In the case in which the number of receivers 200 is, for example, K, when at least one NACK signal is received (or when at least one ACK signal is not received), the patterns are differently classified depending on the number of receivers not receiving packets and stored and the corresponding packets which are not received correctly by the receivers not receiving packets for each pattern may be differently index-coded.

Further, differently index coding the packet which are not received correctly for each pattern means that the method for index coding each corresponding pattern is also changed since each pattern is classified into different patterns depending on the number of receivers not receiving packets.

For example, the case in which there is only one receiver that does not receive the packet and the case in which there are two receivers that do not receive the packet are each classified into different patterns and the packets are combined depending on the number k of ACK signals by applying the above Equation 1 to each corresponding pattern to determine the number of index coding to differently coding each pattern (S18).

In step S18, when the index coding of the packets is performed for each pattern, the index-coded packets are retransmitted to the receivers not receiving packets (S20).

Further, when the index coding packet is retransmitted, to perform each index coding, the corresponding packet sequence numbers of the selected packets before the index coding needs to be retransmitted together.

The reason is that the receiver 200 receives the index-coded packet and then the packet sequence numbers of the packets which are not received correctly are found by the exclusive OR (XOR) operation of the corresponding packet sequence numbers of the packets selected before the index coding with the already successfully received packet sequence numbers and the packets which are not received correctly need to be decoded based on the found packet sequence numbers.

If the packets which are not received correctly of each receiver 200 are m1, m2, and m3, the index coding is transmitted while being formed of m1⊕m2⊕m3. In this case, if the packet sequence number of m1 is X1, the packet sequence number of m2 is X2, and the packet sequence number of m3 is X3, each packet sequence number may be transmitted to the receiver 200 along with the index-coded packet.

A process of matching the packet sequence numbers for the received index-coded packets with the pre-stored successfully received packet sequence numbers is required, which in detail performs the operation processing by X1⊕X2⊕X3 and performs the operation processing by X1⊕X2⊕X3 if the packet sequence numbers of the already successfully received packets are X1 and X2 to again perform the XOR operation processing X1⊕X2⊕X3⊕X1⊕X2 on the two operation Equation, thereby finding out the packet sequence number X3 of the packet which are not received correctly m3. The packets which are not received correctly are decoded by finding out the corresponding packet sequence number and then performing the XOR processing on the successfully received packets.

Meanwhile, among the packet sequence numbers transmitted to the receiver 200, not all the packet sequence numbers to each packet are transmitted, but a packet sequence number of a first transmitted packet or a packet sequence number having the smallest number, and only the increment corresponding to a difference value from the packet sequence number of the first transmitted packet or the packet sequence number having the smallest number and the rest packet sequence numbers may be transmitted. By doing so, the number of bit may be reduced to allow the receiver 200 to facilitate the storage and management after the transmission.

FIG. 6 illustrates an example of the packet sequence number management according to the exemplary embodiment of the present invention.

Describing it with reference to FIG. 6, if the packet sequence numbers of the packet index-coded by the transmitter 100 are 1024, 1025, and 1026 and the packet sequence numbers of the packets successfully decoded by the receiver 200 are 1024 and 1025, the numbers may be stored and managed in the transmitter 100 and the receiver 200, respectively. In this case, when storing the packet sequence numbers of the transmitted packets, the transmitter 100 stores and manages 1024 which is the smallest packet sequence number and 1 (1025-1024) and 2 (1026-1024) which are the difference value.

Further, the receiver 200 stores and manages 1024 which is the packet sequence number of the successfully received packet and 1 (1025-1024) which is the difference value, thereby reducing the number of bits which is stored.

Meanwhile, when the NACK signal is not received in the pattern as the result of receiving the ACK signal or the NACK signal (or when only the ACK signal is received), that is, when there is no packet which are not received correctly, the transmitter 100 divides the pattern as another patterns separately from the divided pattern and determines that there is no transmission error not to perform the packet retransmission within the already transmitted window size (S22 and S24).

Further, if the pattern corresponds to the case in which only the NACK signals are received (NACK=K) (or when the ACK signal is not received), that is, the case in which all the packets transmitted within the window size are not received, the transmitter divides the pattern as another pattern separately from the divided pattern and individually retransmits each of the packet which are not received correctly without performing the index coding (S26 and S28). In this case, since there are no successfully received packets, even if the packets are index-coded and transmitted, the XOR operation processing and the decoding of the packets which are not received correctly may not performed, thereby each packet is retransmitted.

Performing the index coding by calculating the number that may be maximally index-coded depending on the above Equation 1 is described above but the transmission and reception may be performed by adopting only some of the maximum index coding in consideration of the trade-off between the complexity and the hardware performance.

For example, if K=4, in all the cases in which pattern index=1~3, the index coding may be used but to reduce the complexity, only in the case in which patter index=1, the index coding is performed and the rest may also be retransmitted as they are.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

The invention claimed is:

1. A method for transmitting packets by a transmitter in a wireless communication network and retransmitting the packets not received correctly by at least two receivers, the method comprising:
   transmitting, via the transmitter, the packets to the at least two receivers;
   receiving, via the transmitter, reception acknowledgement response signals for the packets transmitted to the at least two receivers, the reception acknowledgement response signals including ACK signals or NACK signals and generated by the at least two receivers;
   analyzing statistically, via the transmitter, patterns of the received reception acknowledgement response signals in accordance with a number of the ACK signals or the NACK signals;
   differently index coding, according to the analyzed patterns, the packets which are not received correctly by each receiver for each analyzed pattern; and retransmitting, via the transmitter, the index-coded packets,
wherein when the transmitter performs the index coding, the transmitter calculates a maximum number of the index-coded packets, and combines the packets not received correctly for the maximum number or for a portion of the maximum number of the index-coded packets for each analyzed pattern.

2. The method of claim 1, wherein the packets are collected based on a window size.

3. The method of claim 2, wherein the analyzed patterns are each classified based on the number of received ACK signals or NACK signals corresponding to the reception acknowledgement response signals for each receiver.

4. The method of claim 3, wherein the transmitter classifies the analyzed patterns depending on whether only some of the receivers receive the packets by analyzing the patterns of the reception acknowledgement response signals and when the analyzed patterns correspond to the patterns received only by some receivers, the packets which are not received correctly by each receiver are selected to be index-coded.

5. The method of claim 1, wherein the transmitter transmits an index coding check bit upon the transmission of the packets to allow each receiver to differentiate the index-coded packets from the packets which are not index-coded.

6. The method of claim 5, wherein the transmitter transmits packet sequence numbers allocated to the packets upon the transmission of the packets to each receiver.

7. The method of claim 6, wherein the transmitter transmits a packet sequence number of a first transmitted packet or a packet sequence number having the smallest number and an increment of the rest of packet sequence numbers when at least two of the packet sequence numbers are transmitted, and
the increment of the rest of the packet sequence numbers is a value corresponding to a difference between the first transmitted packet sequence number or the packet sequence number having the smallest number and each of other packet sequence numbers.

8. The method of claim 7, wherein the transmitter stores and manages a difference value between the packet sequence number of the first transmitted packet or the packet sequence number having the smallest number and the rest packet sequence numbers.

9. The method of claim 4, wherein the transmitter does not perform the retransmission when the analyzed patterns are patterns in which all the receivers receive the packets and transmit packets set based on a subsequent window size.

10. The method of claim 4, wherein the transmitter does not perform the index coding on the packets which are not received correctly by each receiver when the analyzed patterns are the patterns in which all the receivers do not receive the packets and retransmits each of the packets.

11. The method of claim 5, wherein when decoding the packets retransmitted from the transmitter, each receiver determines whether the retransmitted packets correspond to the index-coded packets based on the index coding check bit.

12. The method of claim 11, wherein when the packets retransmitted from the transmitter correspond to the index-coded packets, each receiver performs an exclusive OR operation on already successfully received packets to decode the packets which are not received correctly.

13. The method of claim 12, wherein when decoding the packets which are not received correctly, each receiver finds out packet sequence numbers of the packets which are not received correctly by matching the packet sequence numbers transmitted along with the index-coded packets and the packet sequence numbers of already successfully received packets to decode the packets which are not received correctly.

14. The method of claim 13, wherein the receiver stores the packet sequence numbers of the packets transmitted from the transmitter and stores a packet sequence number of a first transmitted packet or a packet sequence number having the smallest number and an increment of the rest packet sequence numbers and the increment of the rest packet sequence numbers is a value corresponding to a difference between the first transmitted packet sequence number or the packet sequence number having the smallest number and each of other packet sequence numbers.

15. A system for transmitting packets in a wireless communication network and retransmitting the packets not received correctly by at least two receivers, comprising:
a transmitter configured to:
transmit packets to the at least two receivers,
receive reception acknowledgement response signals from each receiver,
differently index coding the packets which are not received correctly, according to received patterns of the reception acknowledgement response signals, and
retransmit the index-coded packets; and
the receivers configured to:
transmit the reception acknowledgement response signals to the transmitter depending on whether or not the packets transmitted from the transmitter are received,
receive the index-coded packets from the transmitter, and
decode the index-coded packets to receive the packets which are not received correctly, wherein the transmitter further includes:
a pattern analyzer configured to classify the received patterns based on a number of received ACK signals or NACK signals corresponding to the reception acknowledgement response signals for each receiver, and
an index coder configured to: analyze the received patterns of the reception acknowledgement response signals, differently set the received patterns based on whether only some of the receivers receive the packets, select the packets which are not received correctly by each receiver in a corresponding received pattern when the received patterns correspond to patterns received by some receivers, and perform the index coding on the selected packets, and
wherein when the transmitter performs the index coding, the transmitter calculates a maximum number of the index-coded packets, and combines the packets not received correctly for the maximum number or for a portion of the maximum number of the index-coded packets for each analyzed received pattern.

16. The system of claim 15, wherein the packets are collected based on a window size.

17. The system of claim 15, wherein the transmitter transmits an index coding check bit upon the transmission of the packets to allow the receiver to differentiate the index-coded packets from the packets which are not index-coded.

18. The system of claim 17, wherein the transmitter transmits packet sequence numbers allocated to the packets upon the transmission of the packets to the receiver.

19. The system of claim 18, wherein when transmitting at least two of the packet sequence numbers, the transmitter transmit a packet sequence number of a first transmitted packet or a packet sequence number having the smallest number and an increment of the rest of packet sequence numbers and the increment of the rest of the packet sequence numbers is a value corresponding to a difference between the first transmitted packet sequence number or the packet sequence number having the smallest number and each of other packet sequence numbers.

20. The system of claim 19, wherein the transmitter further includes a storage configured to store and manage a difference value between the packet sequence number of the first transmitted packet or the packet sequence number having the smallest number and the rest of the packet sequence numbers.

21. The system of claim 15, wherein the transmitter may not perform the retransmission when the received patterns are patterns receiving the packets by all the receivers and transmit the packets set based on a subsequent window size.

22. The system of claim 15, wherein the transmitter does not perform the index coding on the packets which are not received correctly by each receiver when the received patterns are patterns not received by all the receivers and retransmit each of the packets.

23. The system of claim 17, wherein the receiver decodes the packets retransmitted from the transmitter, and upon the decoding, the receiver further includes a decoder determining whether the retransmitted packets are an index-coded packet based on an index coding check bit.

24. The system of claim 22, wherein when the packet retransmitted from the transmitter corresponds to the index-coded packet, the decoder performs an exclusive OR operation on already successfully received packets to decode the packets which are not received correctly.

25. The system of claim 23, wherein when decoding the index-coded packets retransmitted from the transmitter, the decoder finds out packet sequence numbers of the packets which are not received correctly by matching the packet sequence number transmitted along with the index-coded packet and the packet sequence numbers of already successfully received packets.

26. The system of claim 24, wherein the receiver further includes a storage module configured to store a packet sequence number of a first transmitted packet or a packet sequence number having the smallest number and an increment of the rest of packet sequence numbers and store the increment of the rest of the packet sequence numbers which is values corresponding to a difference between the first transmitted packet sequence number or the packet sequence number having the smallest number and each of other packet sequence numbers, as packet sequence numbers of each packet transmitted from the transmitter.

* * * * *